Figure 1:
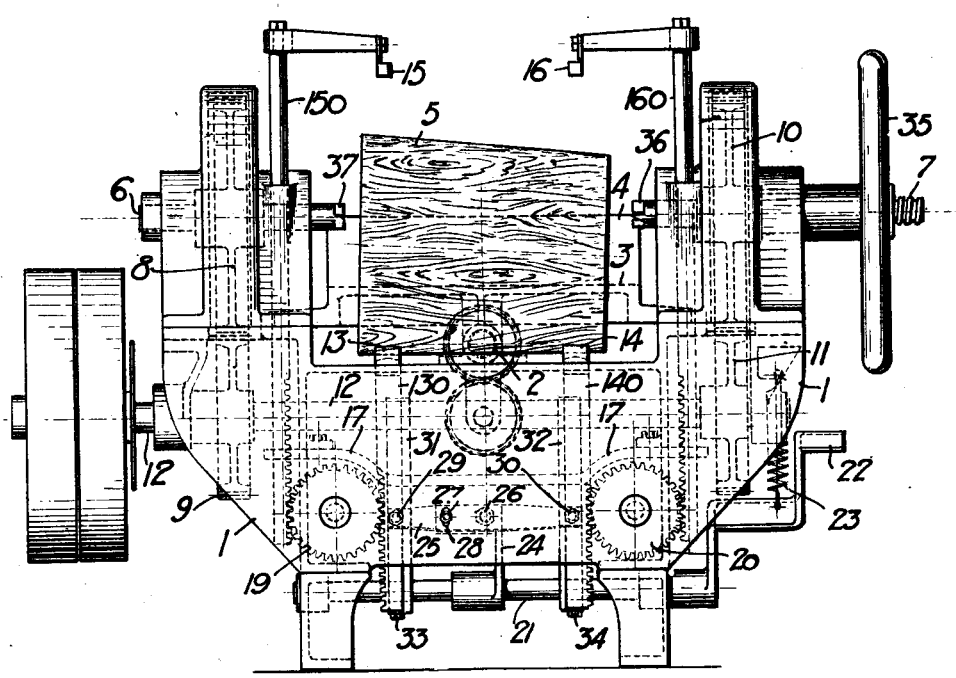

Oct. 18, 1927.

J. G. SJÖSTRÖM 1,646,115

VENEER LATHE

Filed March 25, 1925

5 Sheets-Sheet 1

Inventor:
John Sjöström

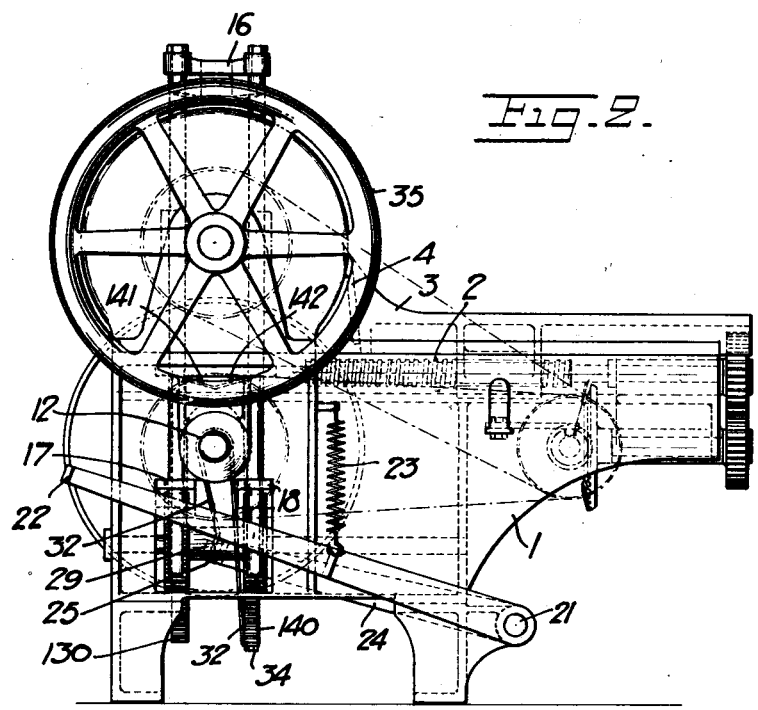

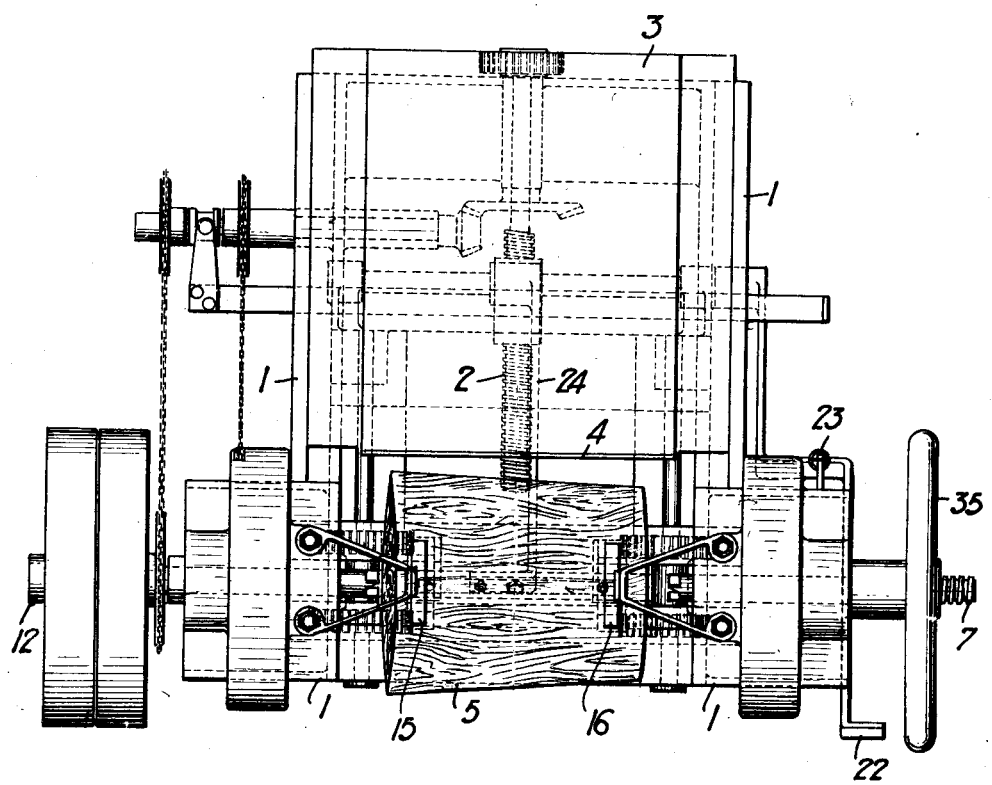

Oct. 18, 1927.  
J. G. SJÖSTRÖM  
VENEER LATHE  
Filed March 25, 1925
1,646,115
5 Sheets-Sheet 4
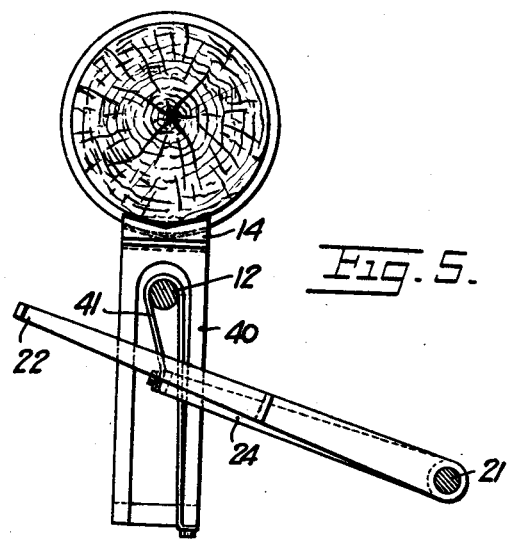
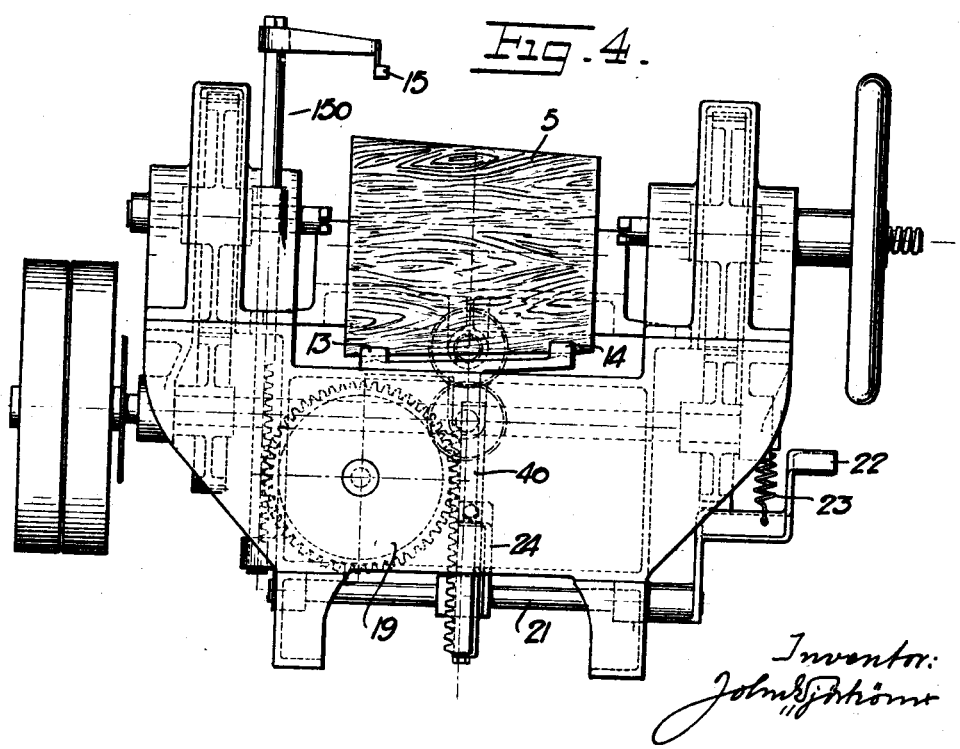

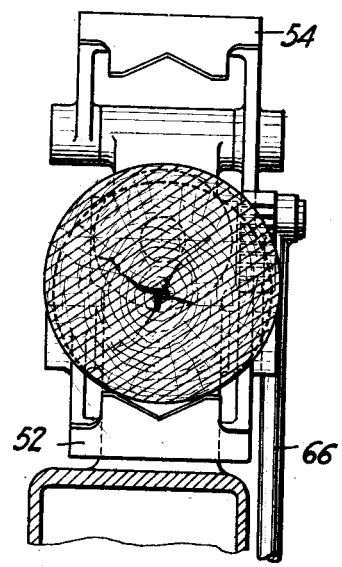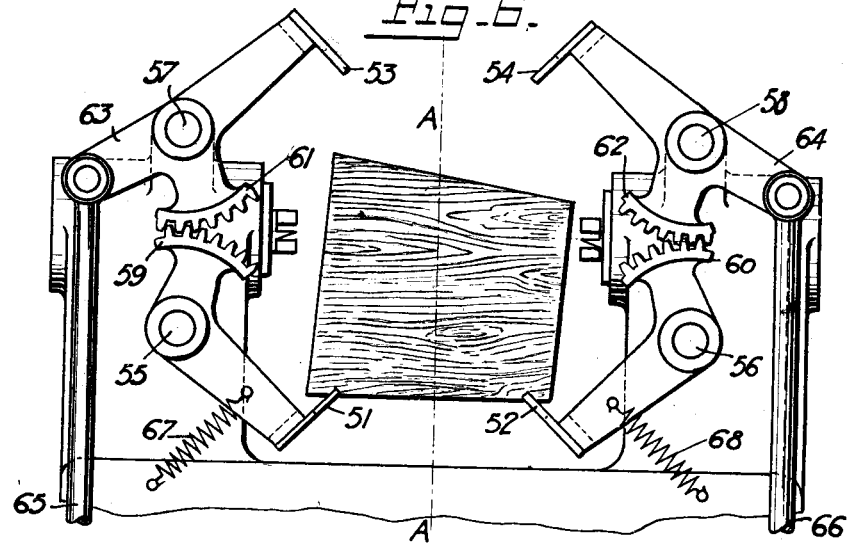

Patented Oct. 18, 1927.

1,646,115

UNITED STATES PATENT OFFICE.

JOHN G. SJÖSTRÖM, OF JONKOPING, SWEDEN.

VENEER LATHE.

Application filed March 25, 1925. Serial No. 18,202.

The present invention relates to veneer lathes, and more particularly to that type of veneer lathes in which the log is clamped in its longitudinal direction between a driving centre and a chuck or between two driving centres and is caused to rotate, while a peeling knife is advanced against the rotating log so as to cut from the latter a continuous sheet of veneer.

The clamping of the log into the veneer lathe has hitherto been effected, generally, either by driving a pronged centre or driver into one end of the log and a socket chuck into the other end of the log whereupon the log, with the said members in engagement therewith, was lifted by the hand and inserted between a rotary mandrel and a fixed chuck carrier or by placing the log without any such gripping members directly between driving centres rigidly attached to mandrels which are then rotated.

Both of the methods above referred to suffer of the drawback that the axis of rotation will, generally, not well coincide with the actual axis of the log with the result that the log in order to be completely cylindrical so as to be able to deliver a continuous sheet of veneer must be turned off to a greater degree than that required in case the axial line of the log and the axis of rotation thereof were in coincidence with a resulting unnecessary large amount of waste wood.

As well known, a log is, generally, of the shape of a frustum of a cone but without any uniform relationship between the diameters of the two bottom surfaces thereof. If an absolutely correct mechanical centering is desired each end of the log must be centered separately. In cases where a less great amount of accuracy may be considered to be sufficient it is possible to adjust the lower supporting centering means in accordance with a predetermined average tapering of the log provided the log is always placed with its wider end in the same direction. According to this invention it is possible to make use of both of the methods above outlined.

With these and other objects in view the invention, generally stated, comprises log supporting means movable towards and away from the desired axis of rotation and holding-up means likewise movable towards and away from said axis of rotation said supporting means and holding-up means, when pressed against the log, maintaining the latter firmly in working position.

With reference to the drawing, Fig. 1 is a front elevation of a veneer lathe according to one embodiment of this invention, provided with separate centering means for each end of the log. Fig. 2 is a side elevation of said lathe, and Fig. 3 is a plan view thereof. Fig. 4 is a front elevation of a veneer lathe having common centering means for both ends of the log. Fig. 5 is a side elevation of the lower or supporting centering member of the lathe shown in Fig. 4. Figs. 6 and 7 illustrate a further modified embodiment in which the centering means are rotatable about fixed axes. Fig. 6 is a front elevation of said embodiment and Fig. 7 is a sectional elevation taken on the line A—A, Fig. 6.

Like reference numerals are used to indicate similar parts throughout the several views.

With reference to Figs. 1–3, the numeral 1 designates the supporting frame of the lathe. Mounted to reciprocate longitudinally in said frame, as under the control of a screw 2 or in any other suitable way, is a carriage 3 to carry the peeling knife 4 adapted to cut the log 5 into a continuous sheet of veneer. Mounted in lateral uprights on the supporting frame are two mandrels 6 and 7 adapted to rotate the log, said mandrels being rotated in the same direction by suitable transmission gears 8, 9 and 10, 11, respectively, from the main shaft 12 mounted in boxes in the frame. One of the mandrels, as 7, is screwthreaded in its outer end and carries a hand-wheel 35 engaging the screw-threads of said mandrel with its correspondingly threaded hub.

The log 5 is supported by two lower centering members 13 and 14 the upper or bearing surfaces of which being shaped so as to carry the log without allowing it to roll. To this end the upper surface of each member 13 and 14 comprises two parts forming an angle with each other as shown in Fig. 2 where 141 and 142 indicate the two parts of the bearing surface of member 14.

Situated vertically above each of the lower centering members 13, 14 is an upper centering or holding-up member 15, 16, respectively.

The centering members 13, 14, 15, 16 are movable up and down. To this end they are each carried by vertical rods 130, 140, 150, 160, respectively, mounted to reciprocate in guides formed in the supporting frame itself as well as in separate guiding gibs 17, 18. Said rods are provided at their lower ends with teeth so as to form toothed racks. The teeth of the rods 130 and 150 mesh with a loosely mounted toothed wheel 19 at opposite sides thereof and the teeth of the rods 140 and 160 mesh with a loosely mounted toothed wheel 20 at opposite sides thereof, as shown in Fig. 1.

Mounted in the lowermost portion of the supporting frame 1 is a transverse shaft 21 carrying a treadle 22 acted on by a spring 23 which tends to lift the treadle. Attached to the shaft 21 is a lever 24 to which a balance lever 25 is pivoted at 26. The balance lever 25 may turn on its pivot between narrow limits determined by a pin 27 secured to the lever 24 which pin engages a slot 28 formed in the balance lever 25. Attached to each end of the balance lever 25, as by means of a bolt 29, 30, is a belt or the like 31, 32, respectively, which is laid over the main shaft 12 and attached with its opposite end to the lower end of the lower supporting member rod 130, 140 by means of bolts 33, 34, respectively.

The operation of the lathe above described is as follows:

The log to be centered and clamped between the mandrels 6, 7 is placed on the lower centering members 13 and 14. The operator then depresses the treadle 22 against the combined action of the weight of the log and the tension of the spring 23. The lever 24 is thereby caused to turn downwardly with a resulting lowering of the balance lever 25. The balance lever 25 moving downwards, the belts 31 and 32 are pressed down against the main shaft 12. Due to the friction thus produced between said belts and the rotating main shaft the latter will cause the belts to move so as to enable further depressing of the treadle 22 and a corresponding raising of the rods 130 and 140 together with the lower centering members and the log resting thereon. As the rods 130 and 140 are raised the rods 150 and 160 with the upper centering members 15 and 16 are lowered accordingly due to the connection between the rods 130, 150 and 140, 160 over the toothed wheels 19 and 20. At the same time that the members 13, 14 lift the log the members 15, 16, will, thus, move downwards toward the log at the same speed.

Provided no slipping has taken place between the individual belts and the main shaft it is easy to see that the upper centering member adapted to cooperate with the wider end of the log, that is, in the embodiment shown the member 15, will reach the log before the other upper member 16 reaches its respective end of the log. As soon as the member 15 engages the log any further movement of the members 13 and 15 towards each other is prevented and, as a result, the respective belt 31 will slip on the shaft 12.

The belt 32, however, will continue to move. The necessary lowering of the respective end of the balance lever 25 is permitted by the pivotal connection of the balance lever 25 to the lever 24. The movement of the belt 32 continues until the upper centering member 16 engages the log whereupon also the belt 32 will slip on the shaft 12. The centering of the log is now completed and the log is maintained in its centered position by continued depression of the treadle until after the next operation, that is, the clamping of the log, has been accomplished.

The clamping of the log is effected by rotating the hand wheel 35 which will cause the mandrel 7 to advance towards the log, the mandrel when engaging the log with its pronged end 36 will move the log with it till the opposite end of the log is engaged by the pronged end 37 of the mandrel 6. The clamping of the log being completed the treadle 22 is released to be immediately restored to normal by the spring 23 thereby restoring the centering members to normal.

It is to be noted that in the embodiment shown the main shaft 12 delivers substantially the whole power necessary for lifting the log which is of great importance as the log may frequently be of heavy weight. The operator has only to press the belts with a slight pressure against the rotary main shaft in order to produce the necessary friction for effecting the lifting operation.

In Figs. 4 and 5 I have shown an embodiment of the invention in which the lower centering members 13 and 14 are rigidly connected together and carried by a common rod 40 movable up and down in the supporting frame. The member 14 adapted to engage the narrower end of the log is placed at a higher level than that of the member 13 corresponding to a predetermined average tapering of the logs. In centering logs the tapering of which corresponds fully to said average tapering such a centering device will, of course, give an equally correct centering as that obtained by the device shown in Figs. 1-3, but the more the tapering of the log differs from said average value the less accurate the centering will be. In this embodiment one upper centering member only, as 15, may be required. The rod 40 carrying the common lower centering member and the rod 150 carrying the upper centering member are formed as toothed racks meshing with a toothed wheel 19 at opposite sides thereof. The rod 40 is connected to the treadle in similar way to that described in connection with Figs. 1–3. Thus, the shaft 21 carrying the treadle 22 with its restoring spring 23 carries a lever 24 to the free end of which is connected a belt 41 laid over the main shaft 12 and connected at its opposite end to the lower end of the rod 40.

In operation, the treadle is depressed causing the belt 41 to engage the rotary shaft 12 with a sufficient pressure to cause the latter to move the belt thereby lifting the rod 40 with the members 13 and 14 and at the same time lowering the upper centering member 15 at the same speed.

In Figs. 6 and 7, I have shown a further modification of the centering device. Two pairs of upper and lower centering members are shown. The pair of centering members adapted to engage the wider end of the log comprises a lower member 51 pivoted to the frame at 55 and an upper member 53 pivoted to the frame at 57. The other pair comprises a lower member 52 pivoted to the frame at 56 and an upper member 54 pivoted to the frame at 58. The members of each pair are geared together by means of toothed segments 59, 61 and 60, 62, respectively. Each upper member is formed with a rear extension 63, 64, to which a controlling link 65, 66, respectively, is pivoted. The lower members are each acted on by a spring 67, 68, tending to lower the respective member. The links 65, 66 may be operated in exactly the same way as that above described in connection with the description of the rods 130 and 140, Figs. 1–3. The operation of this device will be readily understood without any detailed description thereof.

It is to be noted that still further modifications may be made without departing from the principle of the invention.

Thus, for instance, each of the centering members of the embodiment shown in Figs. 1–3 may be divided into two members operated in any of the ways above described.

Furthermore, the common lower centering member shown in Figs. 4–5 may be replaced by two separate members adjusted with respect to each other to correspond to a given average tapering and so connected as to move uniformly and stop simultaneously as soon as the upper centering member or, in case of two such members, one of them engages the log. The said last mentioned modification may be obtained, for instance, by rigidly securing the balance lever 25, shown in Figs. 1–3, to the lever 24.

The operation of the centering members may also be effected in different ways from that shown without departing from the principle of the invention.

What I claim is:

1. The combination with a veneer lathe comprising a supporting frame, a peeling knife, and rotary means to clamp the log, of lower centering members movable substantially vertically up and down to carry a log placed on them, means to lift said members together with the log, and upper centering members movable substantially in the same vertical plane as said first-mentioned members to engage the log and hold it up in order to prevent further lifting thereof after it has been correctly centered.

2. The combination with a veneer lathe comprising a supporting frame, a peeling knife, and rotary log clamping means, of an independent pair of one lower and one upper centering member for one end of the log, another independent pair of lower and upper centering members for the other end of the log, and means adapted to jointly operate both of said pairs till one end of the log is centered and then to operate that pair only corresponding to the other end till said other end of the log is centered 3. The combination with a veneer lathe comprising a supporting frame, a peeling knife, and means to clamp the log, of lower centering means adapted to carry the log in performing the centering thereof, upper centering means to engage the log when centered to maintain the log in centered position, connecting means between said lower and said upper centering means to cause said means to move towards each other at the same speed, a rotary shaft, and means to operatively connect said rotary shaft with said centering means whereby said shaft supplies the power necessary for moving said centering means.

4. The combination with a veneer lathe comprising a supporting frame, a peeling knife, and means for clamping the log, of a treadle and its shaft, a lever on said shaft, a balance lever pivoted to said first mentioned lever, a driving shaft, substantially vertically movable carriers for the log, belts connected to the lower ends of said carriers and to the ends of said balance lever, said belts being each laid as a loop over said driving shaft, substantially vertically movable holding-up means, and connections between said carriers and said holding-up means so designed as to move the holding-up means downwardly, when the carriers are moved upwardly, and vice versa.

In testimony whereof I have signed my name.

JOHN G. SJÖSTRÖM.